United States Patent [19]

Tokoro

[11] 4,194,152
[45] Mar. 18, 1980

[54] RADIO COMMUNICATION SYSTEM

[76] Inventor: Takeshi Tokoro, 3-11, Tenjin-cho, Fuchu-shi, Tokyo, Japan

[21] Appl. No.: 899,520

[22] Filed: Apr. 24, 1978

[30] Foreign Application Priority Data

Apr. 27, 1977 [JP] Japan .................................. 52/48797
Apr. 27, 1977 [JP] Japan .................................. 52/48798

[51] Int. Cl.² ............................................. H04Q 7/02
[52] U.S. Cl. ..................................... 455/31; 340/312;
455/68
[58] Field of Search ............. 179/15 AL, 82; 340/311,
340/312, 313; 325/55, 64, 31, 308, 309

[56] References Cited

U.S. PATENT DOCUMENTS

| | | | |
|---|---|---|---|
| 3,281,789 | 10/1966 | Willcox et al. .................. | 325/55 X |
| 3,760,278 | 9/1973 | Narbaits-Jaureguy et al. ... | 179/82 X |
| 3,973,200 | 8/1976 | Akerberg ......................... | 340/312 X |
| 4,119,804 | 10/1978 | Hafner et al. ................... | 179/15 AL |

*Primary Examiner*—Benedict V. Safourek
*Attorney, Agent, or Firm*—Frishauf, Holtz, Goodman and Woodward

[57] ABSTRACT

In a radio communication system in which local office selection signals respectively asigned to a plurality of local offices are sent in a time sharing basis from a central office to the local offices together with a voice signal, each local office is provided with local office selection signal judging means and a transmitter for transmitting a response signal to the central office when the received selection signal is assigned to the local office. The central office is provided with a response signal judging means for judging that a response signal received thereby was sent from which one of the local offices and display lamps arranged side by side for displaying the local offices that have responded.

10 Claims, 9 Drawing Figures

RADIO COMMUNICATION SYSTEM

BACKGROUND OF THE INVENTION

This invention relates to a radio communication system of the class wherein a master or central office broadcasts a voice to a plurality of slave or local offices respectively owned by listeners in limited areas, while at the same time transmits to the local offices selection signals assigned thereto on a time sharing basis, and the local offices respond during intervals in which they are being selected whereby in the central office response information of respective local offices can be displayed side by side and if desired, communications can be made between the central office and the local offices.

According to the prior art system, information can be transmitted only from the central office to the local offices owned by local listeners through broadcasted signals and the local offices were not provided with any function to reply. Accordingly, the programs of broadcasting have been prepared on the assumption that there is no response from the local offices. When the local offices wish to respond they must rely upon telephones, and even when telephone systems are available, a number of responses would be made to the central office at the same time, thus causing confusion.

SUMMARY OF THE INVENTION

Accordingly, it is an object of this invention to provide an improved radio communication system in which the operator of the central office can readily judge which one of a plurality of local offices has responded to the local office selection signal.

Another object of this invention is to provide an improved radio communication system in which the central office can correctly select a desired local office and wherein the central office and the selected local office can talk with each other through the same broadcasting system.

A further object of this invention is to provide such a system which can operate with a small power.

According to this invention these and further objects can be accomplished by providing a radio communication system comprising a central office including means for producing a voice signal, a local office selection signal generator which generates in a time sharing basis local office selection signals respectively assigned to a plurality of local offices, and transmitting means for radiating the local office selection signals toward the local offices together with the voice signal, each branch office including local offices selection signal judging means which judges whether a local office selection signal received thereby is assigned thereto or not, and means for transmitting a response signal to the central office when the judging means judges that the received local office selection signal is assigned to the local office, the central office further including response signal judging means for judging that a response signal received by the central office was sent from which one of the local offices, and display means responsive to the output of the response signal judging means for displaying the identification of a local office that has sent the response signal.

According to a modified embodiment the central office is further provided with means for fixing the local office selection signal to that of a specific local office, thereby enabling talking between the central office and the specific local office through the broadcasting system.

DESCRIPTION OF THE PREFERRED EMBODIMENTS

Figure 1:
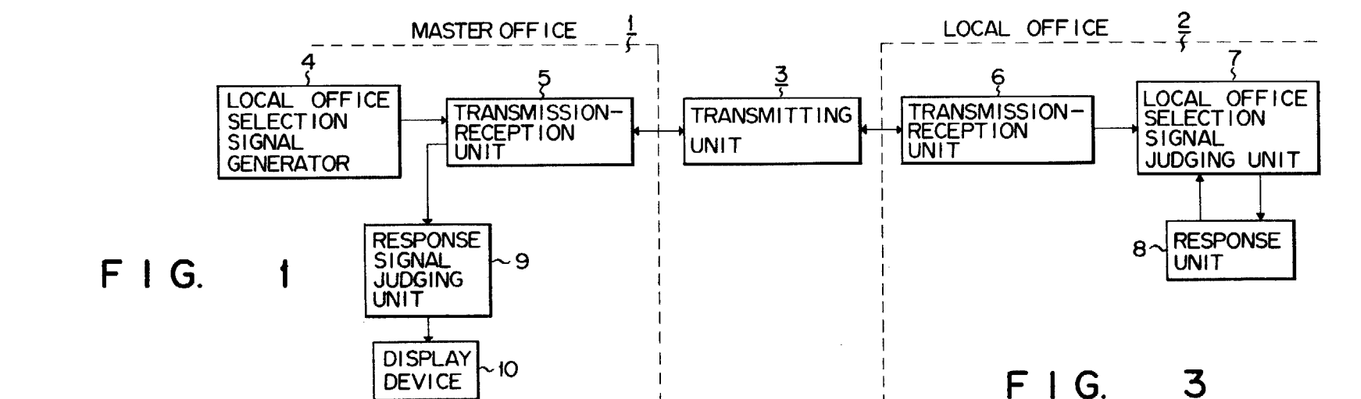
FIG. 1 is a block diagram showing one exmaple of the radio communication system embodying the invention.

In the radio communication system shown in FIG. 1, it is now supposed that the transmitting unit 31 between a central office 1 and a plurality of local offices 2 (only one is shown) transmits voice signals through an inductive radio utilizing a loop antenna. In such case, the central office 1 is provided with a local office selection signal generator 4 which generates local office selection signals on the time sharing basis which are supplied to the loop antenna (to be described later) of the transmitting unit 3 through a transmission-reception unit 5. In the local office 2, the selection signal radiated by the loop antenna of the transmitting unit 3 is received by a transmission-reception unit 6 together with the voice signal and these signals are sent to a local office selection signal judging unit 7 where judgment is made as to whether the received selection signal corresponds to the address of the selected local office or not. Where the received selection signal is the signal assigned to the local office it is sent to a response unit 8. At this time, when a operator closes a response switch, a response signal is radiated from the transmission-reception unit 6 of the local office and this response signal is received by the transmission-reception unit 5 in the central office 1 and then judged by a response signal judging unit 9 in the central office 1 that the received response signal comes from which one of the local offices. Then the response signal is displayed by a display device 10. In this manner, when the selected local office 2 responds to a selection signal sent from the central office 1 on the time sharing basis within an interval in which the selection signal is being received, the response signal is displayed by the display device 10. Of course, the display device is provided with a number of display elements corresponding to respective local offices, so that the operator of the central office can see at a glance the states of response of all local offices.

Figure 2A:
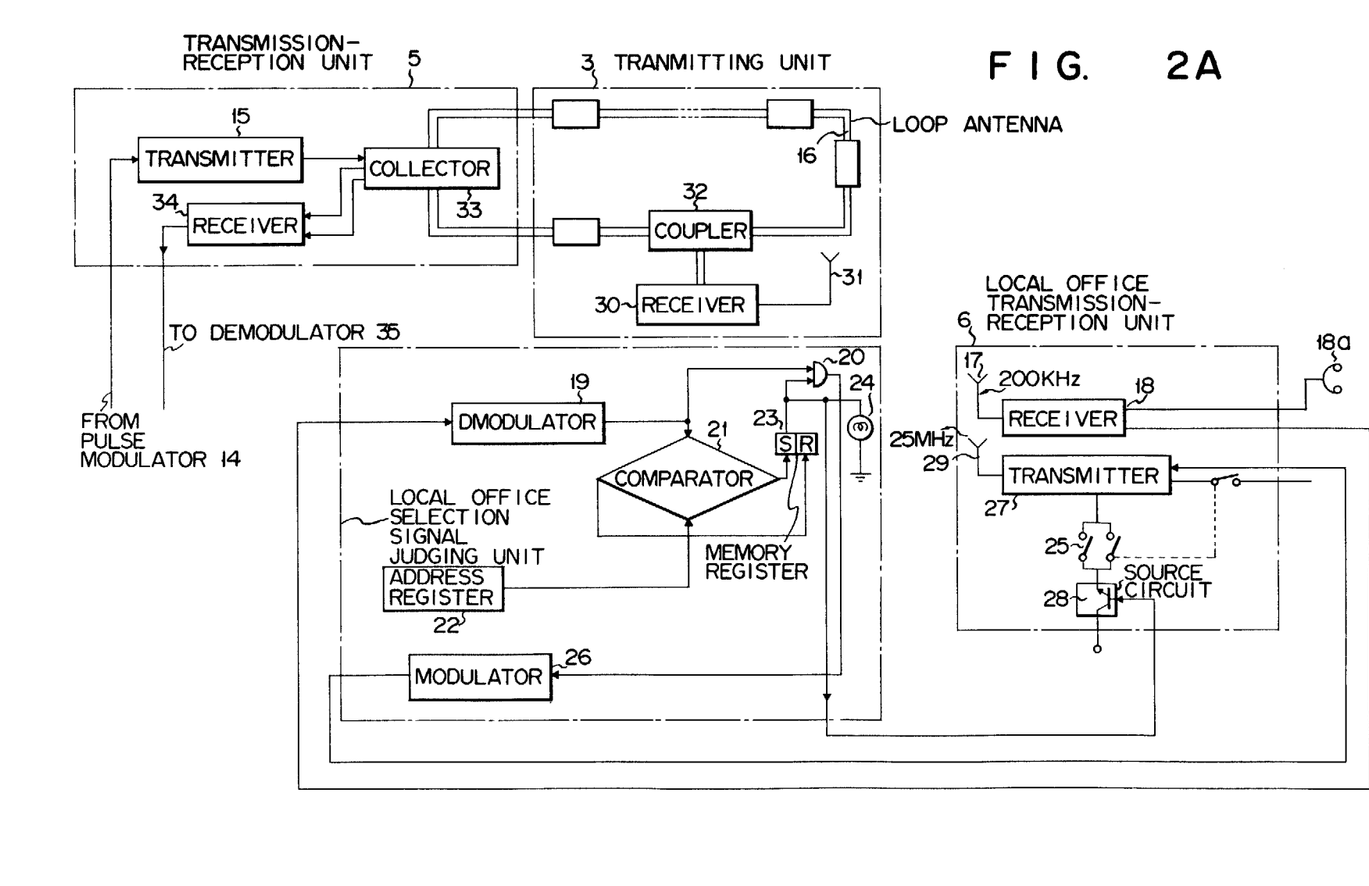
FIGS. 2A and 2B are connection diagrams showing details of the system shown in FIG. 1.
Figure 2B:
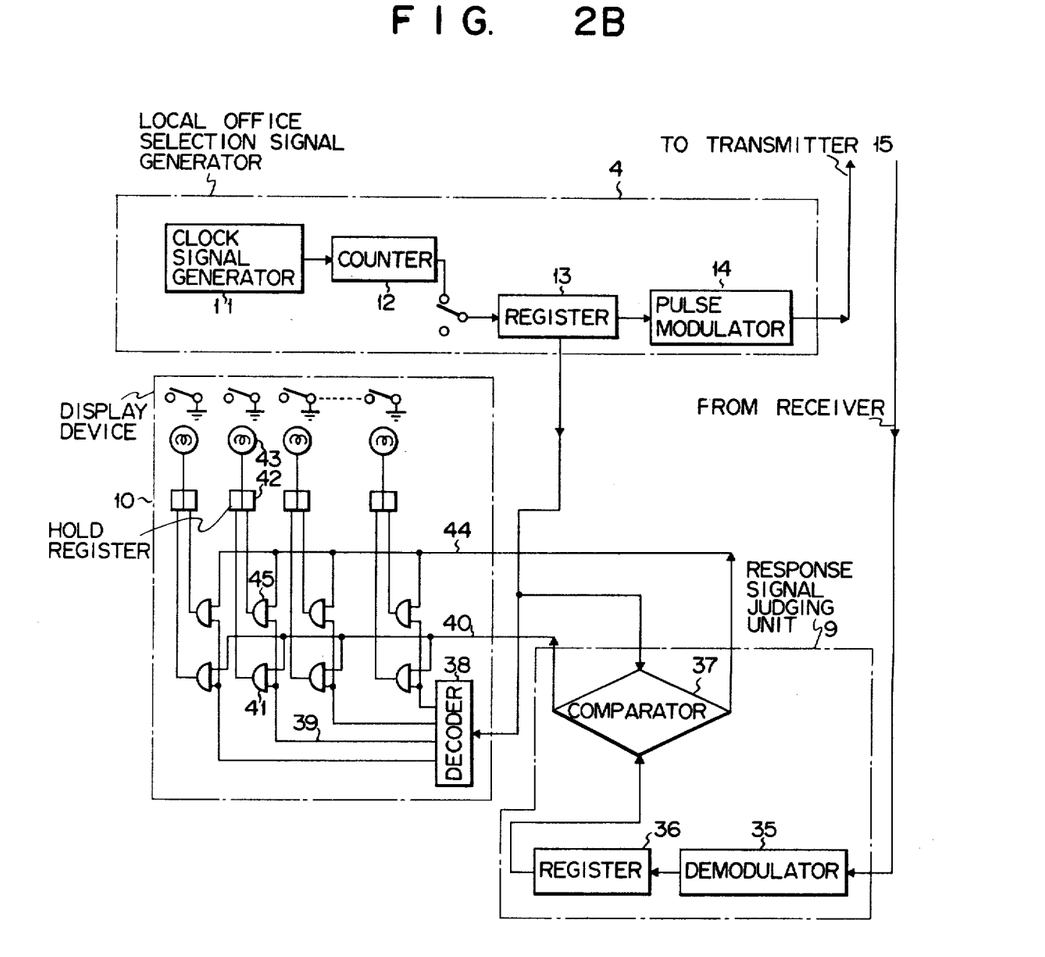

The detailed construction of various units shown in FIG. 1 will now be described with reference to FIGS. 2A and 2B. As shown, the local office selection signal generator 4 comprises a clock pulse generator 11 for generating clock pulses at a definite interval, a counter 12 which counts the number of the clock pulses, and a register 13 for storing the count of the counter 12. The contents stored in register 13 are serially read out and modulated by a pulse modulator 14, for example by a high frequency band portion of the voice signal. The modulated signal is radiated by the inductive radio through a loop antenna 16 having a dual construction of the transmitting unit 3 and through a transmitter 15 of the transmission-reception unit 5 of the central office. The carrier wave of transmitter 15 utilizes a frequency band of from 100 to 240 KHz, for example. The signal radiated by the loop antenna 16 is received by an antenna 17 and a receiver 18 in the local office transmission-reception unit 6. The voice signal component of the received signal is supplied to an ear phone 18a, whereas the selection signal component is converted into serial pulse signals by a demodulator 19 of the local office selection by a demodulator signal judging unit 7, and the serial pulse signals are supplied to one input of an AND gate circuit 20 and a comparator 21. The comparator 21 compares the serial pulse signals with an address signal specific to the local office and has been stored in an address register 22. Upon coincidence, the comparator 21 produces a YES signal which is stored in a memory register 23 and then applied to a lamp 24 for displaying that the local office is called. At the same time, the content of the memory register 23 is applied to the other input of the AND gate circuit 20 whereby the AND gate circuit is enabled to supply its output to a modulator 26 by a carrier wave having a frequency in the high frequency band of the voice signal. The modulated signal is sent to a transmitter 27 of the local office transmission-reception unit 6. However, so long as a response switch 25 between the transmitter 27 and a source circuit 28 is OFF, the response signal would not be radiated. When the operator closes the response switch 25, a small response signal modulated by a carrier wave of 25 MHz, for example, is radiated by antenna 29. The radiated response signal is received by a receiver 30 of the transmitting unit 3 through antenna 31 and then coupled to the transmission line of the loop antenna 16 through a coupler 32. The response signal is then supplied to a receiver 34 in the central office through a collector 33. The response signal is detected by receiver 34 and then demodulated by a demodulator 35 of the response signal judging unit 9 of the central office 1. The demodulated signal is stored in a register 36 and then applied to a comparator 37 which compares the signal stored in the register 36 with the signal stored in the register 13 of the local office selection signal generator 4. Upon coincidence, the comparator 37 produces a coincidence signal. At this time, when the signal on a line, for example 39, designated by a decoder 38 of the display device 10 which decodes the content of register 13 coincides with the signal on a coincidence signal line 40 which passes the coincidence signal generated by the comparator 37, AND gate circuit 41 is enabled to set a hold register 42 lighting a lamp 43 by the output of the hold register 42. A plurality of lamps of the number equal to the number of the local offices are mounted on a display panel (not shown) so that the operator of the central office can see the lamps of all local offices at the same time. If at this time, the response switch 25 of a specific local office is not closed, no signal is applied to register 36 so that the comparator 37 judges that signals in registers 13 and 36 do not coincide with each other thus producing a noncoincidence signal on a noncoincidence signal line 44. Accordingly, an AND gate circuit 45 is enabled to reset the hold register 42 thereby extinguishing lamp 43.

Figure 3:
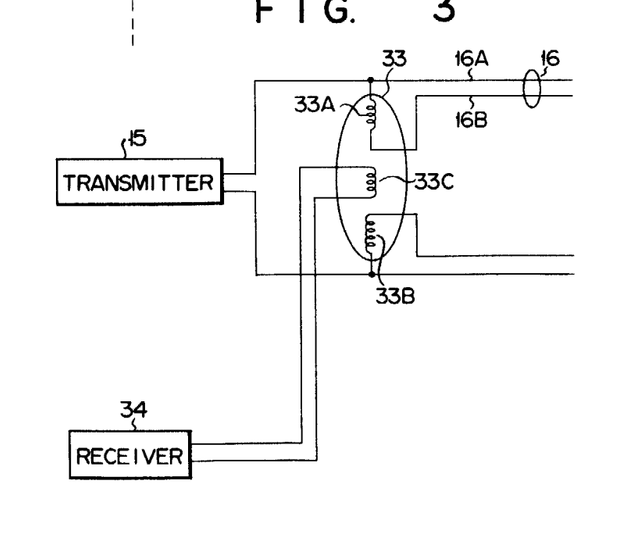
FIG. 3 is a connection diagram showing details of the collector shown in FIG. 2.

As shown in FIG. 3, the collector 33 connected to the loop antenna 16 comprises three coils 33A, 33B and 33C. Each one of coils 33A and 33B is connected between loop antenna elements 16A and 16B and coil 33C coupled with these coils 33A and 33B is connected to the reciever 34. With this construction it is possible to isolate the signal transmitted to the loop antenna elements 16A and 16B from transmitter 15 from the received signal transmitted to the receiver 34.

Figure 4:
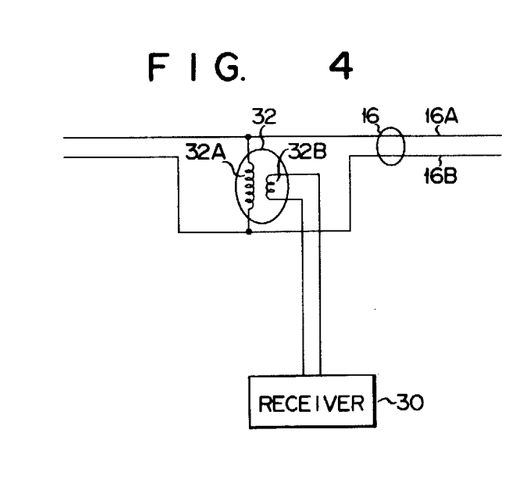
FIG. 4 is a connection diagram showing the coupler shown in FIG. 2.

As shown in FIG. 4, the coupler 32 comprises a pair of coils 32A and 32B which are coupled together. One coil 32A is connected between the loop antenna elements 16A and 16B whereas the other coil 32B is connected to the receiver 30 of the transmitting unit 3. With this construction, the output signal from transmitter 15 is equally divided between the loop antenna elements 16A and 16B.

As above described, according to this invention, local office selection signals are transmitted to a plurality of local office 2 from the central office on the time sharing basis, and each local office judges that whether the local office selection signal received thereby is addressed thereto or not. When the local office selection signal is addressed to a specific local office the operator thereof closes a response switch 25 within a time assigned to that local office so as to send a response signal to the central office 1. Then the response signal judging unit of the central office judges that the received response signal is sent from which one of the local offices and displays the responded local office. Accordingly, the central office can quickly receive response signals from a plurality of local offices in response to the local office selection signals broadcasted by the central office. Moreover since the response signals are displayed by a group of lamps arranged side by side in the same display device, the operator can quickly analyze the states of the local offices at a glance. In contrast, the prior art system in which response is made through a telephone line can not simultaneously receive a number of response signals. Furthermore, as the display is made in accordance with the address of each local office there is no confusion regardless of the fact that a plurality of local offices are involved.

The radio communication system of this invention has the following advantages.

Firstly, the local station radiates its response signal for a very short interval only when the local office selection signal transmitted from the central signal coincides with the address of a specific local office so that the local offices can stably receive the local office selection signals without being interfered by small deviations in a plurality of frequencies of the broadcasted waves.

Secondly, as the powers necessary to operate the central office and the local offices are small (several tens watts for the central office and several tens milliwatts for each local office) the response braodcasting system can be used by mere notice to or permission of the authority.

Thirdly, the transmitting unit comprising two parallel conductors including a loop antenna and installed in each area is extremely simple so that it is easy to increase the number of transmission channels when the parallel conductors are installed in air. Thus it is possible to readily increase the number of the channels of one transmission system by increasing the number of carrier waves utilized by the central office. Where a multi-pole response switch is used in the local office it is possible to increase the type of response.

Fourthly, the power for operating the receiver 30 in the transmitting unit can be supplied from the central office.

Although in the foregoing embodiment, the signal transmission between the central office and the local offices was made by using electric wave transmitted through the air it is also possible to interconnect them by conductors. Instead of using lamps as the display devices luminous diodes, cathode ray tubes, plasma display elements, etc. can also be used. When the display device is connected with an electronic computer, more advantageous effect can be provided. Furthermore, instead of using serial selection signal, parallel selection signals can also be used.

Figure 5:
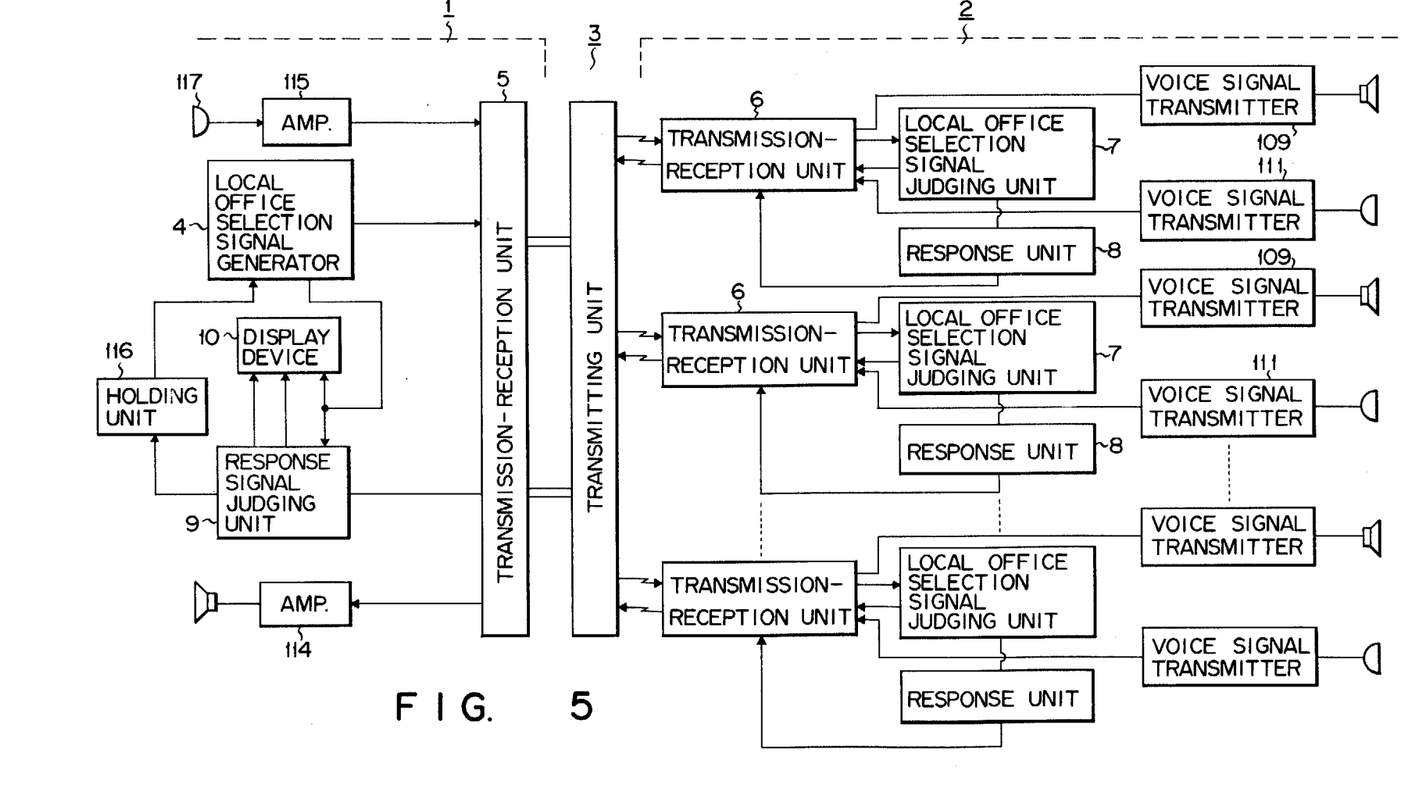
FIG. 5 is a block diagram showing a modified embodiment of this invention.
Figure 6A:
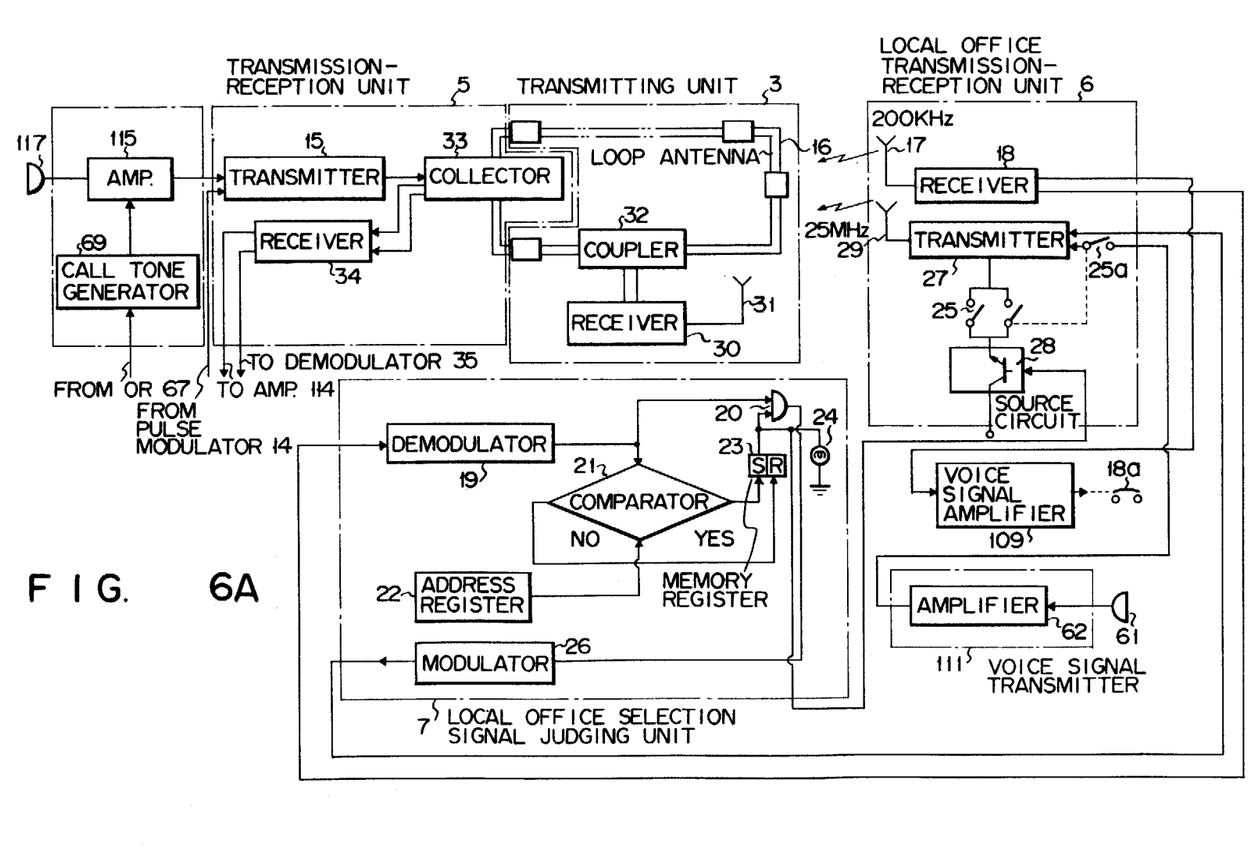
FIGS. 6A and 6B are connection diagrams showing details of the modified embodiment shown in FIG. 5.
Figure 6B:
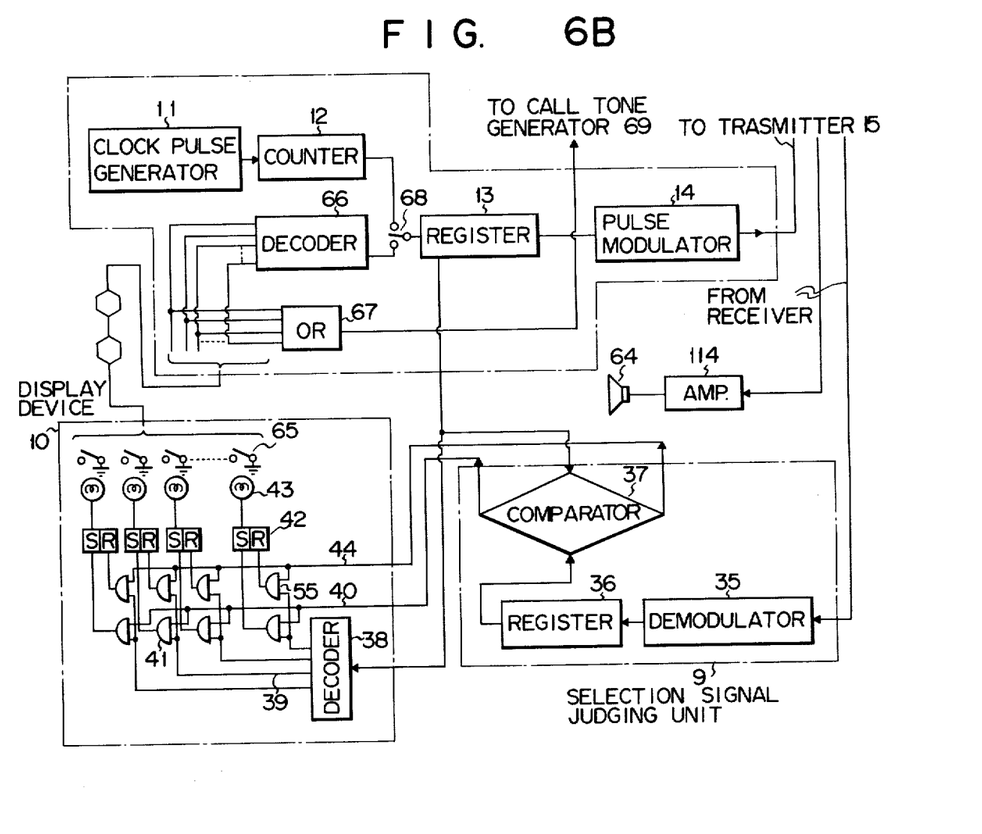

In a modification shown in FIGS. 5, 6A and 6B, a voice communication capability is added to the first embodiment and corresponding elements are designated by the same reference characters. Thus, in FIG. 5, a voice signal generated by a microphone 117 is amplified by an amplifier 115 and applied to the transmission-reception circuit 5 together with the local office selection signals generated by the local office selection signal generator 4. In each local office 2, the voice signal and the local office selection signal are received by the transmission-reception unit 6. The voice signal is amplified by an amplifier 109 and then supplied to an earphone or a loud speaker. The local office selection signal is sent to the local office selection signal judging unit 7 where judgment is made as to whether the received local office selection signal corresponds to the address of a selected local office or not. When it is judged that the received selection signal corresponds to the address, the selection signal is sent to the response unit 8. The construction and operation of this unit are identical to that shown in the first embodiment. In the modification shown in FIG. 5, a voice signal transmitter 111 is provided for transmitting a voice signal to the central office. This signal is received by the transmission-reception unit 5 of the main office through the transmitting unit 3 and then amplified by an amplifier 114. When speech is desired between the central office and a local office, a signal generated by the response signal judging unit 9 in the central office 1 is applied to a holding unit 116 for fixing the local office selection signal generated by the local office selection signal generator 4 to the address of the selected local office thereby enabling speech.

The construction and operation of the modified embodiment shown in FIG. 5 will now be described in more detail with reference to FIGS. 6A and 6B. The construction and operation of clock pulse generator 11, counter 12, register 13 and pulse modulator 14 are identical to those shown in FIG. 2. The output of the modulator 14 and the output of the voice signal amplifier 115 are supplied to transmitter 5 and the output thereof is radiated by loop antenna 16 through induction radio. The signal broadcasted by the loop antenna 16 is received by antenna 17 of receiver 18 of the local office transmission-reception unit 6. The voice signal component is separated by the receiver 18, and then supplied to earphone 18a through voice signal amplifier 109. The local office selection signal component is sent from receiver 18 to demodulator 19 of the local office selection signal judging unit 7 where it is converted into serial pulse signals which are supplied to one input of AND gate circuit 20 and to comparator 21. The comparator 21 compares the serial pulse signals with an address signal specific to each local office and has been stored in address register 22, and when the result of comparison is YES, the coincidence signal is stored in the memory register 23 and utilized to light lamp 24, thus indicating that the given local office is called. At the same time AND gate circuit 20 is enabled and the output thereof is modulated by modulator 26 by a carrier wave. The modulated wave is transmitted to the central office through transmitter 27 and antenna 29, when switch 25 is closed.

The voice signal transmitter 111 is provided with a microphone 61 and an amplifier 62. A switch 25a interlocked with response switch 25 is connected between amplifier 62 and transmitter 27. When switches 25 and 25a are opened, the response signal from modulator 26 and the voice signal are transmitted by the transmitter 27. These signals are received by antenna 31 which is coupled to the loop antenna 16 through coupler 32 and receiver 30 as has been described in connection with the first embodiment. The signal coupled to the loop antenna 16 is applied to receiver 34 of the central office transmission-reception unit 5. The voice signal component separated by the receiver 34 is reproduced by a loudspeaker 64 through an amplifier 114. The response signal component separated by the receiver 34 is applied to the response signal judging unit 9 of the central office 1. The constructions of the response signal judging unit 9 and of the display device 10 are the same as those of the first embodiment. Thus, when the address stored in register 36 coincides with the local office selection signal generated by the local office selection signal generator 4 and has been stored in register 13, a coincidence signal flows through a line 39 designated by decoder 38 which decodes the content of the register 13. When the signal flowing though line 39 and the coincidence signal produced by the comparator 37 and flowing through line 40 coincide each other, AND gate circuit 41 is enabled to operate hold circuit 42 for lighting a lamp 43 corresponding to a responded local office. At this time, when the response switch 25a is not closed, no data is transmitted to register 36. Accordingly, the comparator 37 judges a noncoincidence state and produces a signal on noncoincidence line 44 whereby AND gate circuit 55 is enabled to reset the hold register 42 thus extinguishing the lamp.

When a switch 65 corresponding to an unlighted lamp 43 is closed an address specific to the lamp is decoded by decoder 66. At the same time, OR gate circuit 67 is enabled to throw a transfer switch 68 to the side of decoder 66, thus setting the count of register 13 to the address of the specific lamp 43. As a consequence, the selection signal corresponding to the address of the selected local office corresponding to the unlighted lamp is transmitted continuously. For this reason, it becomes possible to continuously talk between the local office 2 and the central office. In this manner, the central office can confirm why the local office does not respond. The output of the OR gate circuit 67 is applied to a call tone generator 69 for transmitting a call tone to the local office which is reproduced by earphone 18a while the lamp 43 corresponding to the selected local office 2 is continuously lighted.

The collector 33 and the coupler 32 connected to the loop antenna 16 have the same construction as those of the first embodiment.

Thus, in the modified embodiment, by closing switch 65 corresponding to one display lamp 43, talking is made possible between the central office and a specific local office thereby enabling to confirm the state of the local office by speech.

Figure 7:
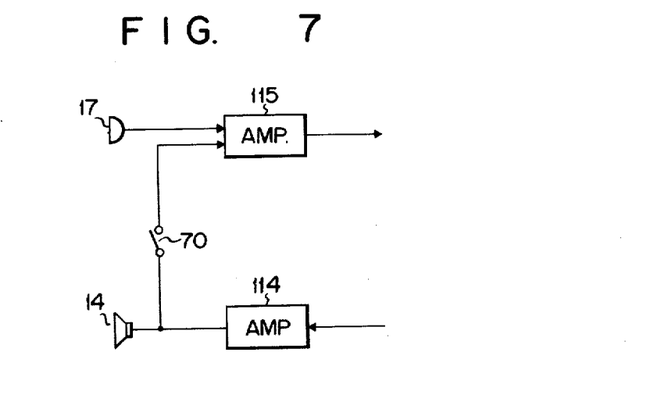
FIG. 7 is a connection diagram showing a partial modification of the circuit shown in FIG. 6.

As shown in FIG. 7 when a switch 70 interposed between receiving amplifier 114 and transmitting amplifier 115 is closed, it is possible to transmit the speech between the central office and a selected local office to all other local offices. For this reason by sequentially selecting different local offices it is possible to transmit the speech between the central office and any local office to all local offices.

As above described according to the modified embodiment, in addition to the advantages of the first embodiment it is possible to have a speech between the central office and a selected local office and if desired to transmit the speech to all other branch offices.

What is claimed is:

1. A radio communication system providing two-way voice communication between a central office and a local office, comprising:

a plurality of local offices; and a central office including means for producing a voice signal to be transmitted to the local offices, a local office selection signal generator which generates, in a time sharing basis, local office selection signals respectively assigned to the plurality of local offices, and transmitting means for radiating said local office selection signals toward said local offices together with said voice signal;

each local office including means for receiving the radiated local office selection signals and said voice signal, local office selection signal judging means which judges whether a received local office selection signal is assigned thereto or not, and means for transmitting a response voice signal and a response signal to said central office when said judging means judges that the received local office selection signal is assigned to said local office;

said central office further including means for receiving signals from said local offices, response signal judging means for judging that a response signal received by the central office was sent from which one of the local offices, and display means responsive to the output of said response signal judging means for displaying the identification of a local office that has sent said response signal.

2. The system according to claim 1 wherein said central office further comprises means for fixing said local office selection signal to that of a specific local office, thereby enabling two-way voice communication between said central office and said specific local office through said broadcasting system.

3. The system according to claim 1 wherein said transmitting means of said central office comprises a loop antenna for simultaneously transmitting said voice signal and said local office selection signals by induction radio.

4. The system according to claim 3 which further comprises a conductor installed in parallel with said loop antenna, said conductor and said loop antenna constituting a two wire parallel transmission path for transmitting a response voice signal and a response signal from said local offices to said central office.

5. The system according to claim 1 wherein said display means comprises a plurality of display elements respectively corresponding to said local offices and arranged side by side.

6. The system according to claim 5 wherein said plurality of display elements comprises lamps.

7. The system according to claim 5 wherein said plurality of display elements comprises luminous diodes.

8. The system according to claim 1 wherein said display means comprises a cathode ray tube.

9. The system according to claim 1 wherein said local office selection signal generator in said central office comprises a register which stores said local office selection signal and wherein said response signal judging means in said central office comprises a comparator for comparing the contents of said register with a received response signal, said comparator energizing said display means when coincidence is obtained between said contents of said register and said received response signal.

10. The system according to claim 1 wherein each local office transmits its respective response signal and response voice signal within a time period corresponding to the time period during which its respective selection signal was transmitted by said central office on said time sharing basis, thereby permitting the central office to judge collectively the presence or absence of a response signal from every local office.

* * * * *